(12) United States Patent
Octaviano, II et al.

(10) Patent No.: US 8,327,008 B2
(45) Date of Patent: Dec. 4, 2012

(54) METHODS AND APPARATUS FOR MAINTAINING NETWORK ADDRESSES

(75) Inventors: Raymond G. Octaviano, II, Raleigh, NC (US); Daryl Cromer, Cary, NC (US); Philip J. Jakes, Durham, NC (US); Howard J. Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 546 days.

(21) Appl. No.: 11/472,492

(22) Filed: Jun. 20, 2006

(65) Prior Publication Data
US 2007/0294421 A1 Dec. 20, 2007

(51) Int. Cl.
*G06F 15/16* (2006.01)
(52) U.S. Cl. ........................ 709/231; 709/232
(58) Field of Classification Search .................. 709/231, 709/232
See application file for complete search history.

(56) References Cited

U.S. PATENT DOCUMENTS

| | | | |
|---|---|---|---|
| 6,401,145 B1 | 6/2002 | Baskey et al. | |
| 6,584,508 B1 | 6/2003 | Epstein et al. | |
| 6,633,761 B1 | 10/2003 | Singhal et al. | |
| 6,771,623 B2 | 8/2004 | Ton | |
| 6,975,864 B2 * | 12/2005 | Singhal et al. | 455/438 |
| 7,213,263 B2 * | 5/2007 | Makineni et al. | 726/11 |
| 7,245,917 B2 * | 7/2007 | Chiueh | 455/442 |
| 2002/0049059 A1 | 4/2002 | Soininen et al. | |
| 2002/0067704 A1 | 6/2002 | Ton | |
| 2002/0112076 A1 * | 8/2002 | Rueda et al. | 709/245 |
| 2002/0118663 A1 * | 8/2002 | Dorenbosch et al. | 370/338 |
| 2003/0195002 A1 | 10/2003 | Singhal et al. | |
| 2004/0042422 A1 | 3/2004 | Pfeiffer | |
| 2004/0248615 A1 * | 12/2004 | Purkayastha et al. | 455/552.1 |
| 2004/0250159 A1 | 12/2004 | Tober et al. | |
| 2005/0013280 A1 | 1/2005 | Buddhikot et al. | |
| 2005/0028206 A1 * | 2/2005 | Cameron et al. | 725/46 |

(Continued)

FOREIGN PATENT DOCUMENTS

JP 2003-323306 11/2003
(Continued)

OTHER PUBLICATIONS abubnick (abubnick, "VMware Graceful Automatic Shutdown and Startup Solution", Jan 14, 2004, http://www.vordesigns.com/Portal/phpBB2/viewtopic.php?t=92&sid=98b73a1813e80c1023).*

*Primary Examiner* — George C Neurauter
*Assistant Examiner* — Joel Mesa
(74) *Attorney, Agent, or Firm* — Ference & Associates LLC

(57) ABSTRACT

This present invention relates to a method for using hypervisors to enable stable wireless network connections. The crux of the invention involves pushing the control of the networking devices from the Operating System level down to a networking front end hypervisor level. The hypervisor will control all networking devices, the authentication for these devices, and the selection of which connection to use. The hypervisor will also perform Network Address Translation (NAT) to the Operating System. Thus, the Operating System will receive a single, private IP address for use with the Operating System's applications. The hypervisor will handle the change of the IP address when roaming between networks and hide it from the Operating System through the use of the NAT.

13 Claims, 2 Drawing Sheets

U.S. PATENT DOCUMENTS

| | | |
|---|---|---|
| 2005/0138424 A1 | 6/2005 | Challener et al. |
| 2005/0226197 A1 | 10/2005 | Reddy et al. |
| 2006/0070066 A1* | 3/2006 | Grobman .......................... 718/1 |
| 2007/0064661 A1* | 3/2007 | Sood et al. .................... 370/338 |
| 2007/0130457 A1* | 6/2007 | Kamat et al. .................. 713/151 |
| 2007/0180436 A1* | 8/2007 | Travostino et al. ........... 717/138 |
| 2007/0294707 A1* | 12/2007 | Taillefer et al. ............... 719/319 |

FOREIGN PATENT DOCUMENTS

| | | |
|---|---|---|
| JP | 2004-512706 | 4/2004 |
| JP | 2004-519117 | 6/2004 |
| JP | 2004-185604 | 7/2004 |
| JP | 2004-318873 | 11/2004 |
| JP | 2005-520227 | 7/2005 |
| JP | 2008-515293 | 5/2008 |

* cited by examiner

METHODS AND APPARATUS FOR MAINTAINING NETWORK ADDRESSES

FIELD OF THE INVENTION

The present invention relates generally to utilizing hypervisors to maintain a constant internet protocol (IP) address while roaming over different networks.

BACKGROUND OF THE INVENTION

As the usage of personal computers (PCs) becomes more widespread and the technology to produce them advances, so to does the amount of communication that is enabled by them. Business and personal needs runs on communication and access to data and PCs have become an essential part of the communication path. Further, the advancement of mobile PCs and mobile computing has enabled applications that utilize IP addresses, and further rely on a stable IP address to function properly. As wireless networking continues to evolve, roaming between different wireless networks will become more common place and bring about a change of IP addresses with roaming. A very pertinent example of this problem is exemplified when roaming from a lower bandwidth to a higher bandwidth network. For example, one may start connecting to the network at 3G WAN because he or she is mobile, but would want to switch to a wireless connection such as the higher 802.11n bandwidth when he or she gets home or to the office. New IEEE standards such as 802.21 and 802.11u will standardize this roaming between networks. As client computers roam from one network to another, the network assigns a new IP address that is relevant to the particular network to which the client is connected. This may disturb those applications that rely on a stable IP address.

One solution is the current marketplace is expensive back end server systems. IBM provides such a system, WECM (Websphere Everywhere Connection Manager) that addresses this issue by providing IP address persistence. Information about WECM may be found at ftp colon slash slash ftp dot software dot ibm dot com slash software slash pervasive slash info slash WECM_V51_ds_062904.pdf However, there are no known inexpensive, widespread solutions to this problem. Further, there are no known client-side implementations of such a solution.

Thus, there exists a need in the art for an inexpensive, client-side method or system which provides stable connections (and a stable IP address) to systems, and thereby applications, that connect to wireless networks. Such a method would ensure that communication methods and data retrieval means remain enabled and useable.

SUMMARY OF THE INVENTION

This present invention relates to a method for using hypervisors to enable stable wireless network connections. Particular refinements in this vein involve pushing the control of the networking devices from the Operating System level down to a networking front end hypervisor level. The hypervisor will preferably control all networking devices, the authentication for these devices, and the selection of which connection to use. The hypervisor will also preferably perform Network Address Translation (NAT) to the Operating System. Thus, the Operating System will receive a single, private IP address for use with the Operating System's applications. The hypervisor will preferably handle the change of the IP address when roaming between networks and hide it from the Operating System through the use of the NAT.

In summary, one aspect of the invention provides a system comprising a hypervisor that enables more than one operating system to run concurrently; a client operating system that connects to a network; at least one application that relies on the IP address relating to the network connection; wherein the hypervisor provides a stable IP address for the client computer as the client computer roams networks.

Another aspect of the invention provides A method comprising enabling more than one operating system to run concurrently through the user of a hypervisor; connecting a client operating system to a network; running at least one application that relies on the IP address relating to the network connection; wherein the hypervisor provides a stable IP address for the client computer as the client computer roams networks.

Furthermore, an additional aspect of the present invention provides a program storage device readable by machine, tangibly embodying a program of instructions executable by the machine to perform method steps, said method comprising the steps of enabling more than one operating system to run concurrently through the user of a hypervisor; connecting a client operating system to a network; running at least one application that relies on the IP address relating to the network connection; wherein the hypervisor provides a stable IP address for the client computer as the client computer roams networks.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

As mentioned above, the present invention relates to a method for using hypervisors to enable stable wireless network connections. The crux of the invention involves pushing the control of the networking devices from the Operating System level down to a networking front end hypervisor level. The hypervisor will control all networking devices, the authentication for these devices, and the selection of which connection to use. The hypervisor will also perform Network Address Translation (NAT) to the Operating System. Thus, the Operating System will receive a single, private IP address for use with the Operating System's applications. The hypervisor will handle the change of the IP address when roaming between networks and hide it from the Operating System through the use of the NAT.

Figures 1A, 1B:
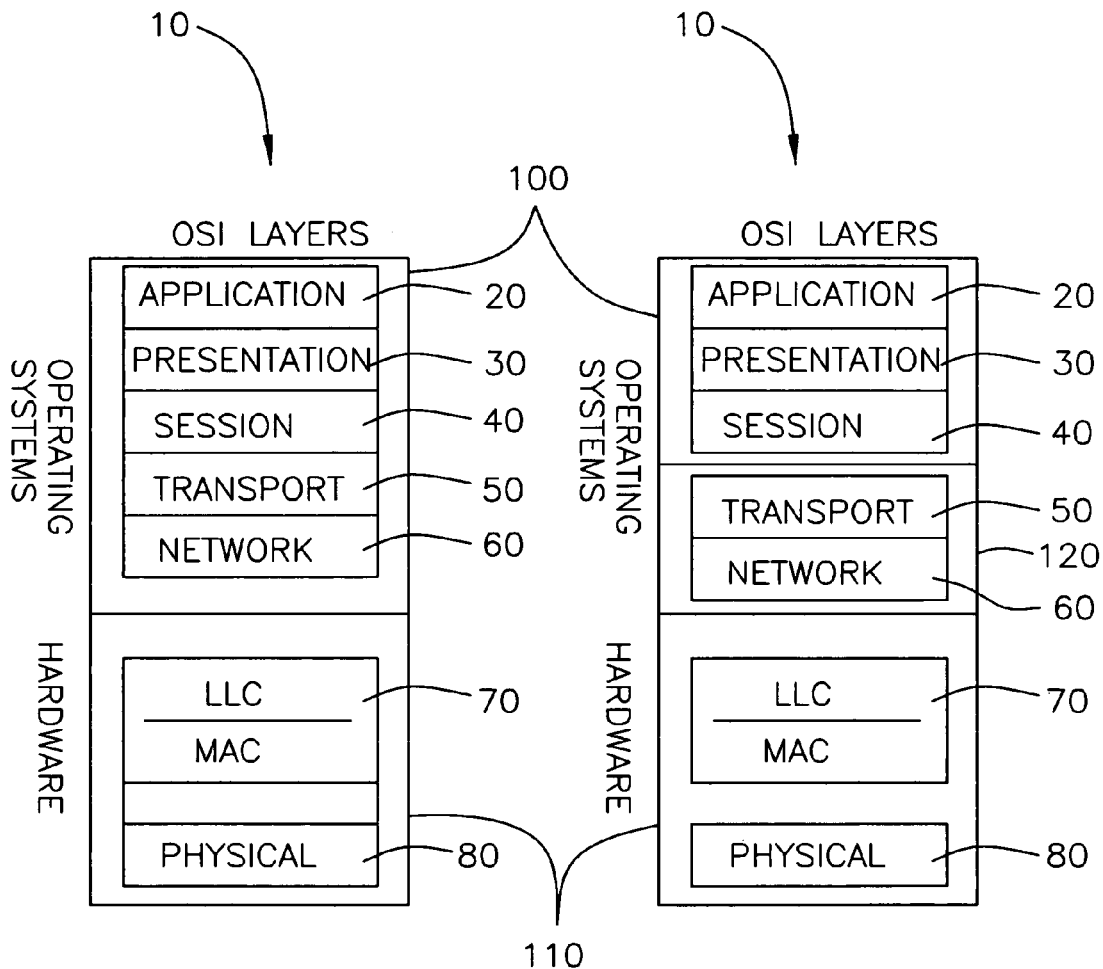
FIG. 1(a) illustrates an example of a prior art OSI architecture.
FIG. 1(b) illustrates an example of an OSI architecture in accordance with the instant invention.

The instant invention utilizes a hypervisor in a novel way as part of the OSI (Open System Interconnection) architecture that is widely used for networking computers and transferring data from one computer to another on the Internet. FIG. 1(a) depicts the current OSI model as known in the art. The OSI model (10) defines a networking framework for implementing protocols in seven layers. The layers, in hierarchal order from top to bottom, consist of the application layer (20), the presentation layer (30), the session layer (40), the transport layer (50), the network layer (60), the data link layer (70), and finally the physical layer (80). Control is passed from one layer to the next, starting at the application layer in one system and moving from one layer to another till control is passed to the physical layer (80) which has a physical link (not shown) that passes control and data from the current system to the recipient system, in which control is passed through again through the hierarchy from the physical layer to the application layer.

Figure 2:
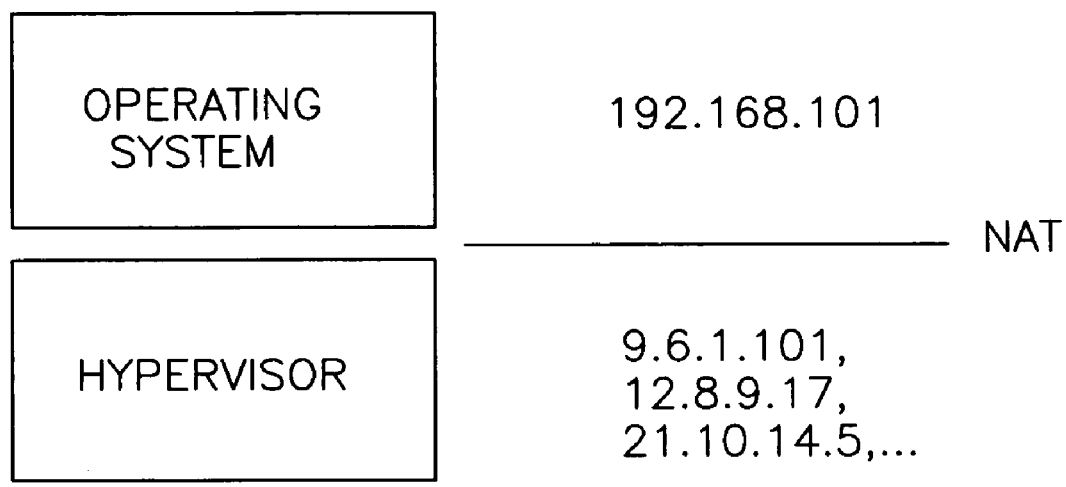
FIG. 2 illustrates an OSI architecture in accordance with the instant invention.

The top four layers are considered to be the upper, Operating System layers (100) of the model, in which the functions and controls implemented in those layers are those done by the Operating System. The three lower layers are considered to be the lower, hardware layers (110), in which control is implemented by the underlying network hardware. The novelty of the instant invention is shown in inserting a hypervisor (120) between the upper, Operating System layers and the lower, hardware layers of the OSI model. FIGS. 1(b) and 2 depict novel models of the instant invention.

A hypervisor is a low end virtual hardware that runs a different Operating System. In a preferred embodiment, the hypervisor is always running, from power up to power down. The hypervisor must be aware of different wireless devices and maintain the drivers needed to talk to those devices. The hypervisor handles all of the logic of switching from one network to another.

The hypervisor is capable of finding a better network based on known policies, such as lower cost, higher bandwidth, and so forth. When the hypervisor recognizes that such a network exists, it switches the client from its existing network to the better network. In this case, the hypervisor maintains the old connection, allowing data flow, until the second connection is up and running. Then, the hypervisor would switch the data flow to the second connection and end the first connection. Thus, the user maintains a steady connectivity and a stable IP address.

The hypervisor is also able to recognize when the network signal has gone. In this scenario, the hypervisor searches for a different signal, and switches the client computer to the new signal. In a preferred embodiment, the hypervisor automatically looks for a wireless or wired connection, especially when the current wired or wireless connection is unavailable, unless the user specifies otherwise. While transferring to the new network, the hypervisor can buffer outgoing data, such that the client computer has no need and no awareness of a change in connection. Thus an appearance of connectivity is maintained.

In this position, the hypervisor will handle all roaming decisions as well as the authentication onto the various networks. The hypervisor will also, perform Network Address Translation (NAT) for the client system. Thus, although the IP addresses assigned to the client change as the client joins different networks, the IP address presented to the operating system and applications supported by the Operating System will remain constant. Thus, the hypervisor enables a stable connection to the networks to which the computer connects and the applications utilize.

In summary, the present invention relates to a method for using hypervisors to enable stable wireless network connections. The crux of the invention involves pushing the control of the networking devices from the Operating System level down to a networking front end hypervisor level. The hypervisor will control all networking devices, the authentication for these devices, and the selection of which connection to use. The hypervisor will also perform Network Address Translation (NAT) to the Operating System. Thus, the Operating System will receive a single, private IP address for use with the Operating System's applications. The hypervisor will handle the change of the IP address when roaming between networks and hide it from the Operating System through the use of the NAT.

It is to be understood that the present invention, in accordance with at least one presently preferred embodiment, includes elements which may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both. Further, the client computer which has been mentioned throughout the disclosure can be any mobile computing device, including desktops, laptops, PDAs, and any other such devices that are known in the art.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising: one or more networking devices; and a hypervisor configured to enable a stable wireless network connection for an operating system and applications thereof, said hypervisor further: controlling the one or more networking devices, said control including selecting a network connection based on one or more policies; and enabling a stable wireless network connection for an operating system and applications thereof via: performing network address translation to an operating system during roaming between networks to maintain a stable IP address to said operating system; and buffering outgoing data during a network connection change such that an appearance of stable network connectivity, including allowing data flow until a second network connection is up and running, is maintained during a change in network connectivity; wherein said hypervisor ends a first network connection responsive to establishing data flow to the second network connection.

2. The system of claim 1, wherein the hypervisor is inserted between upper, Operating System layers and lower, hardware layers of an OSI model.

3. The system of claim 1, wherein selecting a network connection further comprises automatically searching for and connecting to a wireless network when the apparatus is not currently connected.

4. The system of claim 1, wherein the hypervisor is configured to control all wireless devices of the apparatus.

5. The system of claim 4, wherein the hypervisor is configured to maintain drivers necessary to talk to all wireless devices of the apparatus.

6. The system of claim 1, wherein the hypervisor is configured to run from power up of the apparatus to power down of the apparatus.

7. A method comprising:
an act of controlling one or more networking devices of an apparatus with a hypervisor implemented in said apparatus; and an act of enabling a stable wireless network connection for an operating system and applications thereof with the hypervisor;

said controlling further comprising selecting a network connection based on one or more policies;

said enabling further comprising:

performing network address translation to an operating system during roaming between networks to maintain a stable IP address to said operating system; and buffering outgoing data during a network connection change such that an appearance of stable network connectivity, including allowing data flow until a second network connection is up and running, is maintained during a change in network connectivity;

wherein said hypervisor ends a first network connection responsive to establishing data flow to the second network connection.

8. The method of claim 7, wherein the hypervisor is inserted between upper, Operating System layers and lower, hardware layers of an OSI model.

9. The method of claim 7, wherein selecting a network connection further comprises the hypervisor automatically searching for and connecting to a wireless network when the apparatus is not currently connected.

10. The method of claim 7, wherein the hypervisor is aware of all wireless devices of the apparatus.

11. The method of claim 10, wherein the hypervisor maintains drivers necessary to talk to the wireless devices.

12. The method of claim 7, wherein the hypervisor runs from power up of the client computer to power down of the client computer.

13. A non-signal program storage device readable by machine, tangibly embodying a program of instructions executable by the machine to perform acts, said acts comprising:

an act of controlling one or more networking devices of an apparatus with a hypervisor implemented in said apparatus; and an act of enabling a stable wireless network connection for an operating system and applications thereof with the hypervisor;

said controlling further comprising selecting a network connection based on one or more policies;

said enabling further comprising:

performing network address translation to an operating system during roaming between networks to maintain a stable IP address to said operating system; and buffering outgoing data during a network connection change such that an appearance of stable network connectivity, including allowing data flow until a second network connection is up and running, is maintained during a change in network connectivity;

wherein said hypervisor ends a first network connection responsive to establishing data flow to the second network connection.

\* \* \* \* \*